(No Model.)
T. P. OWEN.
ATTACHMENT FOR DRAFTSMEN'S COMPASSES FOR MEASURING LINES.
No. 391,067. Patented Oct. 16, 1888.
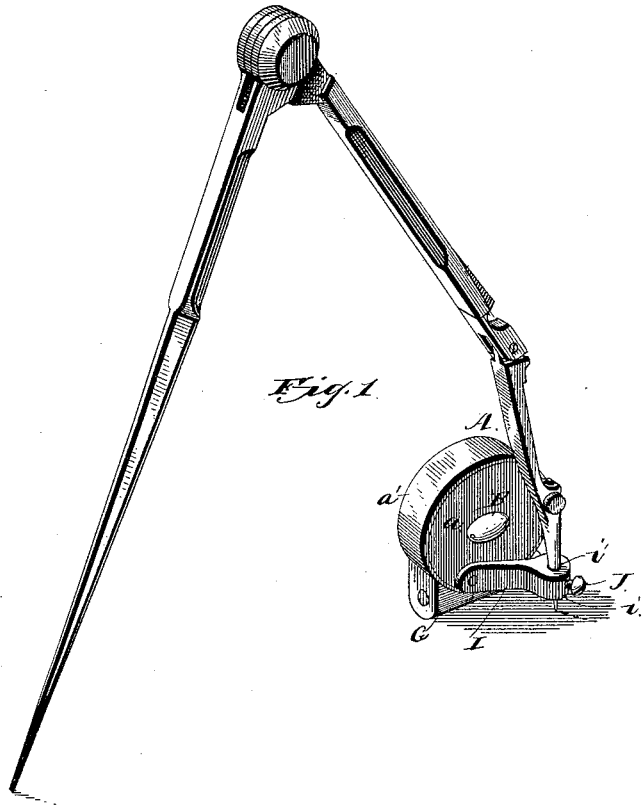
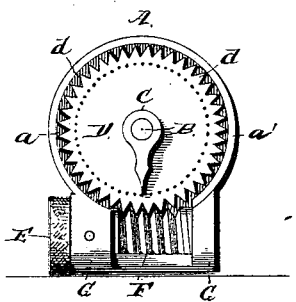
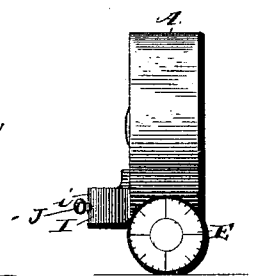
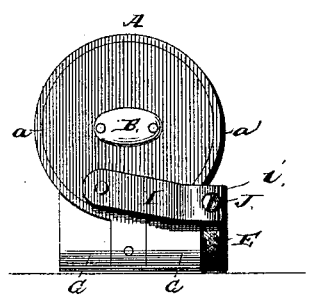
Witnesses.
Geo. F. Thorpe
H. F. Riley.
Inventor
Thomas P. Owen.
By his Attorneys
C. A. Snow & Co.

UNITED STATES PATENT OFFICE.

THOMAS PHILOP OWEN, OF YORK, NEBRASKA.

ATTACHMENT FOR DRAFTSMEN'S COMPASSES FOR MEASURING LINES.

SPECIFICATION forming part of Letters Patent No. 391,067, dated October 16, 1888.

Application filed May 8, 1888. Serial No. 273,217. (No model.)

*To all whom it may concern:*

Be it known that I, THOMAS PHILOP OWEN, a citizen of the United States, residing at York, in the county of York and State of Nebraska, have invented a new and useful Improvement in Surface-Measuring Instruments, of which the following is a specification.

The invention relates to improvements in surface-measuring instruments.

The object of the invention is to produce a neat and compact device adapted to be attached to the leg of a pair of compasses and capable of indicating with accuracy the distance around the circumference of a circle.

Furthermore, the object of the invention is the production of a measuring-instrument capable of attachment to the style or marker of any line-making instrument, such as an ellipsograph, or the like, and accurately measuring any curved outline or path passed over by the style or marker; and, finally, the object of the invention is to provide a device adapted to be held in the hand and moved over any surface and of accurately measuring such surface.

The invention consists in the novel combination and arrangement of the parts hereinafter fully described, illustrated in the accompanying drawings, and pointed out in the claims hereto appended.

In the accompanying drawings, forming part of this specification, and in which like letters of reference designate corresponding parts, Figure 1 is a perspective view illustrating the improved surface-measuring instrument attached to the leg of a pair of compasses. Fig. 2 is a front elevation of the device, and Fig. 3 is a rear elevation. Fig. 4 is a side elevation.

Referring to the accompanying drawings, A designates the casing, made of suitable material, preferably copper, brass, German silver, or like metal, consisting of a circular back plate, $a$, and the cylindrical side piece, $a'$, secured to the circular back plate, $a$, in any suitable manner.

In the center of the circular back plate, $a$, is fixed a pin or pivot, B, of a length a little less than the cylindrical side piece, $a'$, of the cylindrical casing A, in order that a pointer or handle, C, and a disk, D, secured to it may be within the casing A. The pointer or handle C is rigidly fixed to the pin or pivot B, while the disk D is mounted on the pin or pivot between the handle or pointer C and the back plate, $a$, of the casing A, and is adapted to revolve around it. The circumference of the disk D is provided with cogs or teeth $d$, and its face bears a graduated scale, which is marked off in equal parts to represent feet and inches; and when the disk D is caused to revolve by a wheel, E, and a worm, F, the starting-point of the scale is carried beyond the hand or pointer C a number of marks, which will indicate in feet and inches the distance passed over by the wheel E.

The wheel is secured upon the end of the worm F, which is journaled in suitable bearings G, and meshes with the cogs or teeth $d$ on the periphery of the disk D and rotates the disk when the wheel E is turned. The outer face of the wheel E bears a scale. The circumference of the wheel E may be of any desired size, but it is preferably of two inches, and the distance is divided down to sixteenths of an inch. The circumference of the wheel E being two inches at each half-revolution of the wheel E, the disk D, by means of the worm F, meshing with its cogs or teeth $d$, is carried forward one point, and at each complete revolution of the wheel E is carried forward two points, which indicates that a distance of two inches has been traversed. It will thus be seen that as the wheel E moves over the surface to be measured the disk D will be caused to rotate, and the distance will be indicated by the hand or pointer C, which will give the feet and inches, and the fraction of an inch may be ascertained by referring to the wheel E, whose circumference is divided off in sixteenths of an inch.

In order to insure the rotation of the wheel E and the consequent operation of the device, a band of rubber or other suitable material is provided upon the rim of the wheel E, which is grooved for its reception.

Upon the rear of the casing A is a piece of metal or arm, I, having an enlarged end, $i$, which is provided with an opening or hole, $i'$, adapted to receive one of the legs of a pair of compasses or a style or a pen of a similar instrument, and to retain the device in place a set-screw, J, is provided. The opening or hole $i'$ is in the same plane as the wheel E, in order that the wheel E will travel the same path as the leg of the pair of compasses or other marker inserted in the hole or opening.

From the foregoing description and the accompanying drawings the construction, operation, and advantages of the invention will readily be understood; and it will readily be seen that the improved measuring-instrument is capable of attachment to the leg of a pair of compasses and of accurately measuring the circumference of a circle described by the compasses, and also capable of use by hand to measure distances on curved surfaces.

It will of course be understood that I do not limit myself to the precise details of construction herein shown and described, as I may, without departing from the spirit of my invention, make any minor changes therein.

Having thus fully described my invention, what I claim as new, and desire to secure by Letters Patent, is—

1. A surface-measuring instrument adapted to be secured to the leg of a pair of compasses, and comprising the cylindrical casing provided upon its lower side with bearings, a cogged disk mounted in the casing and having upon its face a scale of equal parts, a worm journaled in said casing and meshing with the cogged disk, and a wheel secured to an end of the worm and provided with a linear scale, substantially as described.

2. A surface-measuring instrument comprising a casing having a suitable pointer and provided with an arm having an eye or opening and a set-screw whereby the device is secured to the leg of a pair of compasses, a cogged disk mounted in the casing and bearing a scale of equal parts, a worm suitably journaled in the casing, and a wheel secured to an end of said worm, substantially as described.

In testimony that I claim the foregoing as my own I have hereto affixed my signature in presence of two witnesses.

THOMAS PHILOP OWEN.

Witnesses:
A. M. STARK,
A. F. MILLER.